Patented Sept. 16, 1952

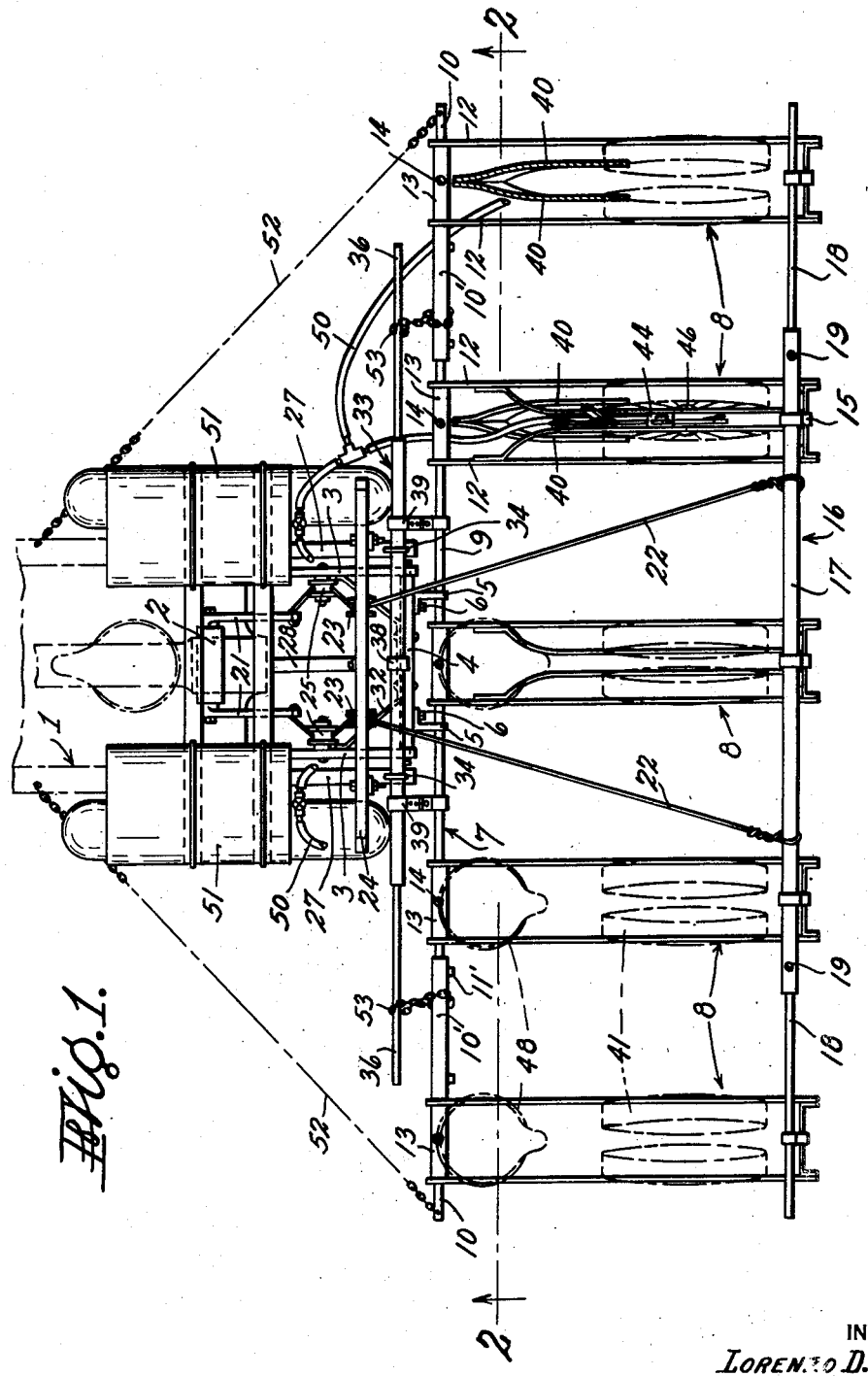

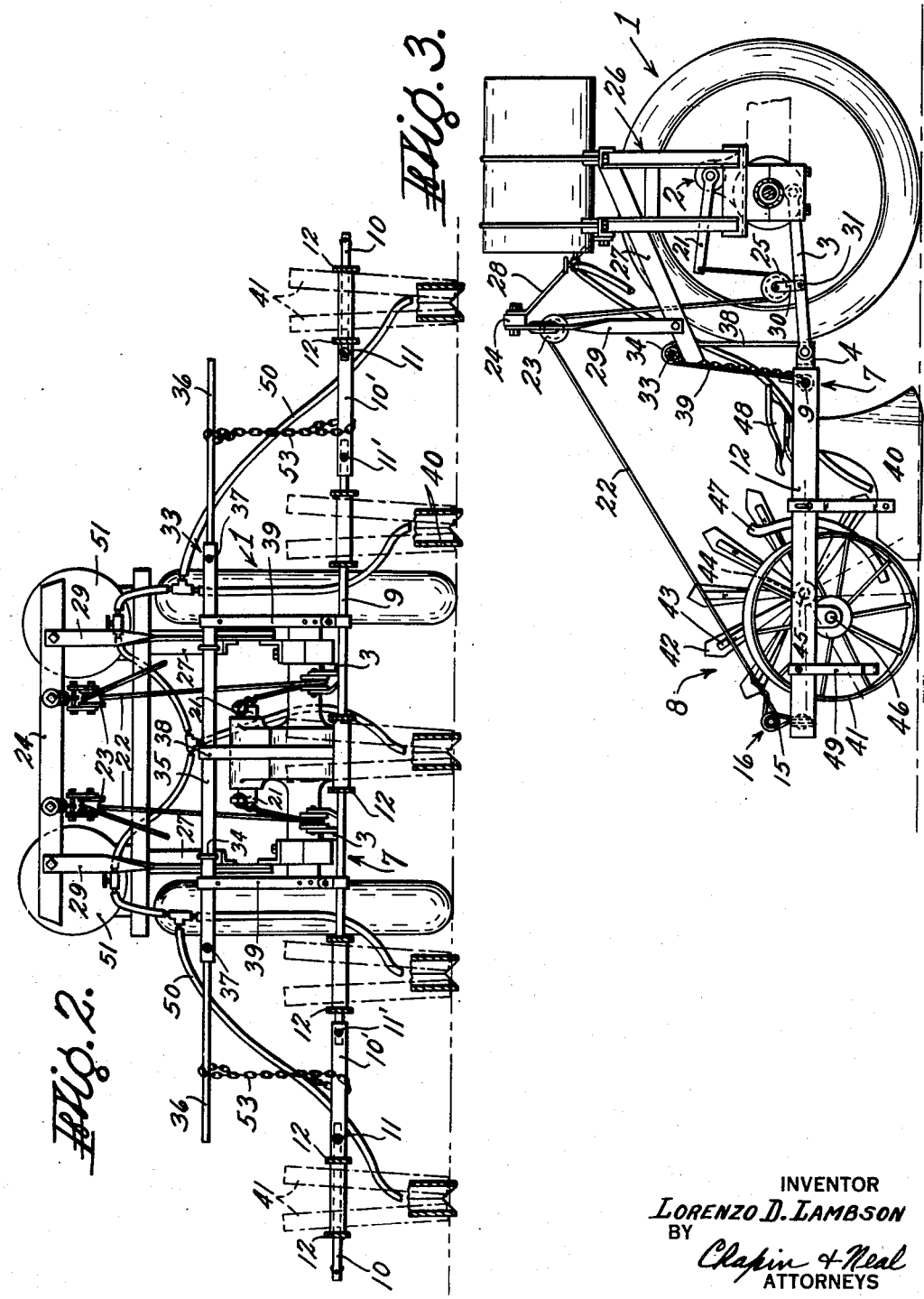

2,610,563

UNITED STATES PATENT OFFICE 2,610,563

TRACTOR IMPLEMENT HITCH

Lorenzo D. Lambson, Southwick, Mass.

Application July 30, 1948, Serial No. 41,689

2 Claims. (Cl. 97—232)

This invention relates to a machine for setting tobacco plants and more particularly to a machine for setting a plurality of rows of plants simultaneously.

Machines commonly used for the purpose require two operators for each row being set and the accurate spacing of the plants in each row has been dependent on the speed and skill of each operator. Plant setting machines have been proposed which require but one operator to a row but such proposals have required a special and relatively costly tractor and the row capacity has been limited.

It is the principal object of the present invention to provide a relatively inexpensive machine having a five row capacity which can be powered by a conventional farm tractor and which requires in addition to the driver of the tractor only one operator per row. Further objects are to secure faster operation, more accurate spacing of the rows and spacing of the plants in the row, more economical operation and ease in transporting the machine to and from the place of use.

Other and further objects residing in the details of construction and arrangement of the parts will be made apparent from the following specification and claims.

In the accompanying drawings which illustrate one embodiment of the invention:

Fig. 1 is a plan view of the machine, parts being broken away;

Fig. 2 is a rear elevational sectional view substantially on line 2—2 of Fig. 1; and Fig. 3 is a side elevational view of the structure shown in Fig. 1, parts being broken away.

Referring to the drawings, 1 indicates a tractor of the conventional farm type with certain modifications later pointed out, and which includes the usual hydraulic lift generally indicated at 2.

The tractor is provided with a draw bar comprising a U frame which includes side members 3 and a cross member 4. A stiffly flexible gang bar generally indicated at 7 is connected centrally to cross member 4 by angle brackets 5 bolted to the cross bar at 6. As shown, five plant setting units, each generally indicated at 8 and later more fully described, are connected in spaced relation to the gang bar. The transverse extent of the five spaced units 8 is too great for efficient transportation over ordinary roads and the ends of the gang bar 7 are therefor preferably made detachable. As shown, the gang bar includes a central rod 9 (Figs. 1 and 2), to which the three center units are connected, and end members 10 to which the two outer units are connected. The members 10 are releasably secured in sleeves 10' by set screws 11 or other suitable means, and the sleeves are similarly releasably secured to the ends of rods 9 as by set screws 11'. The end members and the plant setting units connected thereto may therefore be temporarily removed for transportation purposes.

The units 8 include side frame members 12 which are pivotally connected to the gang bar, sleeves 13 being positioned between the members 12 and secured to the gang bar by set screws 14 to hold the units in desired spaced relation on the gang bar.

The free ends of the unit frame 12 are connected by strap members 15 to a tail bar generally indicated at 16 which consists of a central tubular section 17 in the ends of which end members 18 are telescoped and releasably held in position by set screws 19. The free ends of the units 8 are loosely connected to bar 16 as by the strap member 15, the degree of looseness being only sufficient to make effective the restricted freedom allowed the individual units by the flexibility of the gang bar as later more fully described.

The bar 16 is connected to the arms 21 of the lifting means 2 of the tractor by cables or other suitable means 22. The cables 22, the rear ends of which are secured to bar 16, pass over pulleys 23, suspended from a beam 24 carried by the tractor, and around lower pulleys 25 carried by the draw bar members 2 to the arms 21.

The tractor is provided with a frame structure, generally indicated at 26, which includes rearwardly extending arms 27. The beam 24 is supported from the frame 26 (Fig. 3) by a strut 28 and by post members 29 which are bolted to arms 27. The lower pulleys 25 are connected to members 3 of the draw bar by forks 30 secured by bolts 31 which also secure a U-shaped brace 32 (Fig. 1) to the members 3 and 4.

A transverse bar indicated at 33 is secured by yokes 34 to the rear ends of arms 27, above and substantially parallel to the gang bar 9. Bar 33 comprises a central section 35 in the ends of which end sections 36 are telescoped and held in adjusted position by set screws 37. The bar 33 is connected to the cross member 4 of the draw bar frame by a strut 38, and is connected adjacent its center to the gang bar by struts 39.

When arms 21 of the lifting means of the tractor are raised cables 22 draw the bar 17 upwardly thus simultaneously raising the trailing ends of the planter unit frames 12 about the gang bar 9 as a pivot to raise the planter units clear of the ground.

The planter units themselves may take any suitable or desired form. As shown each consists of spaced plow members 40 which, as the unit is drawn behind the tractor, opens a trench for the reception of the plants. The trailing end of the unit is supported by inclined wheels 41 which close the trench. Pairs of fingers 42 and 43 extend radially from a hub 44 which is rotatable about an axis 45 offset forwardly and slightly above the axis 46 of the wheels 41 and driven therefrom. The fingers 42 which are normally spaced from fingers 43, are closed against elastic bands, not shown, which are carried by fingers 43, by a cam member 47 to hold the plants which are carried downwardly by the fingers and set in the trench previously opened by members 40. The earth is closed around the roots of the plants by the wheels 41 as the plants are released by the fingers. An operator is carried by each unit on a seat 48 supported from the side frames 12, the operator's feet resting in side stirrups 49. As the fingers 42—43 are opened the operator places a plant, from a source of supply not shown, between the temporarily opened fingers. As will be apparent the weight of the operator is effective closely adjacent the pivotal connection of the units to the gang bar so that the lift has a leverage advantage represented by substantially the length of frame member 12 in lifting the operator with the units.

Controlled amounts of water may be fed to the trench opened by the members 40 through suitable valve controlled hose connections as indicated at 50 from tanks 51 carried by frame 26.

As previously mentioned the gang bar is stiffly flexible. This flexibility is limited in a substantially horizontal plane by cables or chains 52 connected between the ends of the gang bar and the frame of the tractor. The end portions of the gang bar are adjustably coupled to the end members 36 of bar 33 as by adjustable chains 53. When the contour of the ground requires, the ends of the gang bar may be flexed upwardly by the shortening of the chains 53.

By the construction described it will be seen that each plant setting unit may swing independently vertically upwardly in following the ground contours and can twist slightly as permitted by the flexible character of the frame structure in which they are supported but the path of all the units in the direction of the rows being set is controlled by the tractor since the flexible frame is connected to the latter by the rigid frame 26 and the connection does not permit articulate movement between the gang bar and the tractor. The flexibility of the gang bar permits a slight independent bodily upward or downward movement of the units, the degree of flexibility being adjustable by means of chains 53.

The controlled flexibility of the gang bar is important to the successful operation of the machine and makes possible the proper function of each planting unit at the same time that accurate spacing of the rows is maintained by the maintenance of the direction of the tractor. The tractor operator has merely to keep the tractor centered on the premarked line of the center row of the field being set.

The accuracy of operation is of particular advantage in setting shade grown tobacco since two passes of the machine will set the ten rows between the lines of tent poles with no accumulation of row spacing errors to bring the outside rows too close to the line of poles.

I claim:

1. A hitch for connecting a plurality of tobacco setters to a tractor having a lift which comprises a horizontal gang bar, frame means for rigidly attaching said bar to the frame of the tractor at two spaced points adjacent the center of the bar, the end portions of the bar extending outwardly from said points of attachment, said extending end portions being stiffly flexible, spaced setter supporting frames, one for each setter that is to be connected by the hitch, the leading ends of said setter supporting frames being each pivotally connected to said gang bar for pivotal movement in a vertical plane only, a tail bar, means for connecting said tail bar to the lift of the tractor at two spaced points adjacent the center of the tail bar, the end portions of the tail bar extending outwardly from said spaced points of connection, said extending end portions being stiffly flexible, means loosely connecting the trailing end of each setter supporting frame to said tail bar, one of said setter supporting frames being connected to the gang bar and tail bar between the said spaced points of connection of said bars to the tractor frame and tractor lift respectively, the remaining setter supporting frames being connected to the said extending stiffly flexible portions of said bars.

2. A hitch as in claim 1 in which the frame means which connects the gang bar to the tractor carries a horizontal bar positioned above and parallel to the gang bar and having stiffly flexible end extensions, said end extensions being connected to the stiffly flexible end extensions of the gang bar by adjustable chains.

LORENZO D. LAMBSON.

REFERENCES CITED

The following references are of record in the file of this patent:

UNITED STATES PATENTS

| Number | Name | Date |
| --- | --- | --- |
| 316,845 | Snyder | Apr. 28, 1885 |
| 705,337 | Gatling | July 22, 1902 |
| 1,050,439 | Erdmann | Jan. 14, 1913 |
| 1,348,862 | Genung | Aug. 10, 1920 |
| 1,435,075 | Marshall | Nov. 7, 1922 |
| 1,544,094 | Krebs | June 30, 1925 |
| 1,769,085 | Trial | July 1, 1930 |
| 1,886,457 | Winkley | Nov. 8, 1932 |
| 1,928,362 | Schutmaat | Sept. 26, 1933 |
| 1,946,686 | Graham et al. | Feb. 13, 1934 |
| 1,952,982 | Gregg | Mar. 27, 1934 |
| 2,407,006 | Harris | Sept. 3, 1946 |